US012775523B1

(12) United States Patent
Cao et al.

(10) Patent No.: US 12,775,523 B1
(45) Date of Patent: Oct. 27, 2026

(54) ELASTIC CLOUD STORAGE CHUNK TYPE SUPPORT INSIDE GARBAGE COLLECTION

(71) Applicant: Dell Products L.P., Round Rock, TX (US)

(72) Inventors: Jiang Cao, Shanghai (CN); Kalyan C Gunda, Shrewsbury, MA (US); Yi Ye, Shanghai (CN); Ao Sun, Shanghai (CN); Yurun Wu, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 19/188,353

(22) Filed: Apr. 24, 2025

(51) Int. Cl.
*G06F 12/00* (2006.01)
*G06F 11/10* (2006.01)
*G06F 12/02* (2006.01)

(52) U.S. Cl.
CPC ...... *G06F 11/1076* (2013.01); *G06F 12/0246* (2013.01); *G06F 12/0253* (2013.01)

(58) Field of Classification Search
CPC ............. G06F 11/1076; G06F 12/0246; G06F 12/0253
See application file for complete search history.

(56) References Cited

U.S. PATENT DOCUMENTS

2006/0101204 A1* 5/2006 Bao ........................ G06F 3/0665 711/170
2012/0011340 A1* 1/2012 Flynn .................. G06F 12/0623 711/E12.016
2013/0064052 A1* 3/2013 Mehra ................ G11B 20/1217 369/30.01
2016/0188407 A1* 6/2016 Bronnikov .......... G06F 11/1076 714/766
2017/0177045 A1* 6/2017 Seo ..................... G06F 12/0246
2020/0026781 A1* 1/2020 Bhardwaj et al. ..... G06F 16/164
2021/0342153 A1* 11/2021 Han ...................... G06F 9/5022

* cited by examiner

*Primary Examiner* — Shawn X Gu
*Assistant Examiner* — Mohammad S Hasan
(74) *Attorney, Agent, or Firm* — Amin, Turocy & Watson, LLP

(57) ABSTRACT

Presented is support for garbage collection inside a chunk. For instance an example method can comprise: determining whether small object data has been deleted from a physical storage location associated with an erasure coding strip, clearing a bit of a group of bits from a usage bitmap, wherein the bit represents the physical storage location of where the small object data is stored to the erasure coding strip, and the usage bitmap is associated with the erasure coding strip, determining that all bits of the group of bits representing an erasure coding segment of the erasure coding strip have not been cleared from the usage bitmap, executing a collapse garbage collection process within the erasure coding strip, and modifying a logical memory offset to a physical memory offset mapping based on a result of the performance of the collapse garbage collection process within the erasure coding strip.

20 Claims, 13 Drawing Sheets

ELASTIC CLOUD STORAGE CHUNK TYPE SUPPORT INSIDE GARBAGE COLLECTION

BACKGROUND

Elastic Cloud Storage (ECS) is a scalable, distributed storage system designed to handle vast amounts of data across multiple locations while ensuring high availability, fault tolerance, and efficiency. ECS equipment/systems provide organizations with a flexible and cost-effective solution by dynamically allocating storage resources based on demand, preventing underutilization or over-provisioning. ECS equipment/systems support various storage models, including object, file, and block storage, making ECS equipment/systems suitable for diverse workloads such as big data analytics, backup and archival, and cloud-native applications. By leveraging erasure coding (EC), ECS equipment enhances data durability by distributing data chunks and associated parity chunks across multiple nodes (e.g., storage equipment), enabling recovery even in cases of hardware failures. With built-in support for multi-tenancy (e.g. storage management functionalities and facilities that aid corporate business entities, large and small, to develop applications faster and more efficiently, by enabling groups of users to both share the resources of a centralized storage architecture and customize their storage environments without affecting other groups of users), automated data tiering (e.g., storage management strategies that automatically move data between different types of storage based on data usage, performance needs, and cost-efficiency-ensuring that frequently accessed (hot) data is stored on high-performance storage while infrequently accessed (cold) data is moved to lower-cost, high-capacity storage), and integration with cloud services, ECS equipment empowers enterprises to manage and scale their storage infrastructure seamlessly while ensuring data security and compliance.

Storage chunks are fundamental units of data division in modern storage systems, allowing efficient data management, redundancy, and recovery. Chunks can be categorized into different types based on their function and storage architecture. Data chunks can contain actual user data and are the primary building blocks of stored information. Parity chunks can store redundancy information, and can be generated using erasure coding or RAID techniques, thereby enabling data reconstruction in cases of failures. Metadata chunks can hold essential details about stored data, such as location, size, and access permissions, facilitating quick retrieval and system organization. In distributed and cloud storage systems, chunks can be spread across multiple nodes (e.g., storage equipment) to improve fault tolerance and load balancing. By categorizing storage chunks, systems can optimize performance, ensure data integrity, and enhance scalability, making them a crucial component of modern elastic and resilient storage architectures.

Garbage collection (GC), as a concept, is an automated memory management process that reclaims unused or obsolete data to optimize system performance and prevent memory leaks. GC is commonly used in programming languages with dynamic memory allocation, such as Java, Python, and the like. GC identifies and removes objects that are no longer referenced by applications, freeing up memory for future use. Different GC algorithms/processes exist, including reference counting, mark-and-sweep, stop-and-copy, and generational GC, each balancing efficiency, system overhead, and pause times. In storage systems, GC can play a crucial role in managing solid-state drives (SSDs) and log-structured file systems (e.g., a type of file system that writes data sequentially in a log-like structure, optimizing write performance and reducing fragmentation-instead of modifying data in place, log-structured file systems append new writes to the end of a log and periodically clean up obsolete data through GC), wherein obsolete data must be erased before new data can be written. By automating memory and storage cleanup, GC enhances application performance, prolongs hardware lifespan, and reduces the risk of crashes or slowdowns caused by excessive memory consumption.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
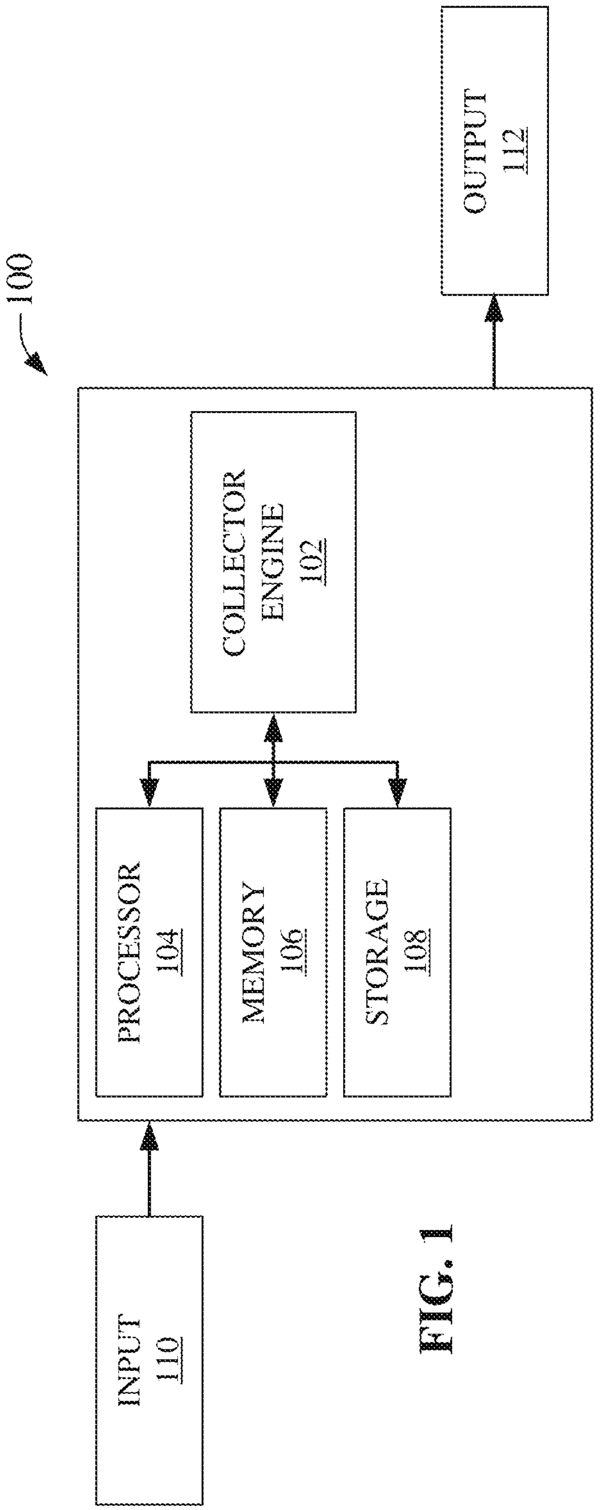
FIG. 1 illustrates a block diagram of a system for performing garbage collection (GC) within a self-GC-chunk, in accordance with various non-limiting example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

In accordance with various example embodiments, a system, apparatus, or device is provided comprising: a processor; and a memory that stores executable instructions that, when executed by the processor, facilitate performance of operations. The operations can comprise: in response to a garbage collection instance transitioning from a first state to a second state, determining whether small object data has been deleted from a physical storage location associated with an erasure coding strip that is included in a self-garbage collection-chunk, clearing a bit of a group of bits from a usage bitmap, wherein the bit of the group of bits represents the physical storage location where the small object data is stored to the erasure coding strip, and wherein the usage bitmap is associated with the erasure coding strip, determining, based on the usage bitmap, that all bits of the group of bits representing an erasure coding segment of the erasure coding strip have not been cleared from the usage bitmap. performing a garbage collection process within the erasure coding strip, and updating a logical memory offset to a physical memory offset mapping based on a result of the performing of the garbage collection process within the erasure coding strip.

Concerning the foregoing and in accordance with some embodiments, the garbage collection process can be a collapse garbage collection process performed within the erasure coding strip. The collapse garbage collection process can comprise: determining, using the usage bitmap, locations of a group of voids within the erasure coding strip segment of a collection of erasure coding strip segments associated with the erasure coding strip, wherein the group of voids separates a group of the small object data stored at different locations within the collection of erasure coding strip segments, removing the group of voids that separates the group of small object data at the different locations, coalescing and redistributing the group of the small object data to reduce a number of erasure coding strip segments of the collection of erasure coding strip segments occupied by the group of small object data, and updating the usage bitmap to reflect, in the usage bitmap, the coalescing and the redistributing of the group of small object data.

In accordance with the foregoing, the first state can be a hibernation state and the second state can be an operational state, and a size associated with the small object data can be less than a defined size limit threshold. Additionally, the self-garbage collection-chunk can be comprised of groups of erasure coding strips and groups of mirror strips, wherein an erasure coding strip of the groups of erasure coding strips can comprise a defined number of erasure coding segments, and wherein a mirror strip of the groups of mirror strips can comprise a defined number of mirror segments.

Further, in some additional and/or alternative embodiments, the garbage collection process performed within the erasure coding strip included in the self-garbage collection-chunk can be a merge-way-garbage collection cross strip process. In most embodiments the erasure coding strip can comprise a defined number of parity segments, and the erasure coding strip can conform to a code scheme that defines a correspondence pattern of a first number of erasure coding segments to a second number of parity segments.

In accordance with further embodiments, the subject disclosure describes a method, comprising a sequence of acts that can include: in response to a garbage collection instance transitioning from a first state to a second state, determining, by storage equipment comprising one or more processors, whether small object data has been deleted from a physical storage location associated with an erasure coding strip that is included in a self-garbage collection-chunk, clearing, by the storage equipment, a bit of a group of bits from a usage bitmap, wherein the bit of the group of bits represents the physical storage location where the small object data is stored to the erasure coding strip, and wherein the usage bitmap is associated with the erasure coding strip, based on the usage bitmap, determining, by the storage equipment, that all bits of the group of bits representing an erasure coding segment of the erasure coding strip have not been cleared from the usage bitmap, executing, by the storage equipment, a first garbage collection process or a second garbage collection process within the erasure coding strip, and maintaining, by the storage equipment, a logical memory offset to a physical memory offset mapping based on a result of the executing of the first garbage collection process or the second garbage collection process within the erasure coding strip.

In the context of the foregoing, and in accordance with various example embodiments, the first garbage collection process can comprise: determining, by the storage equipment, via use of the usage bitmap, locations of a group of voids within the erasure coding strip segment of a collection of erasure coding strip segments associated with the erasure coding strip, wherein the group of voids separates a group of the small object data stored at disparate locations within the collection of erasure coding strip segments, removing, by the storage equipment, the group of voids that separates the group of small object data at the disparate locations, aggregating and redistributing, by the storage equipment, the group of the small object data to reduce a number of erasure coding strip segments of the collection of erasure coding strip segments occupied by the group of small object data, and modifying, by the storage equipment, the usage bitmap to reflect, in the usage bitmap, the aggregating and the redistributing of the group of small object data.

In some embodiments, the first state can be a hibernation state and the second state can be an operational state, a size associated with the small object data can be less than a defined size limit threshold, and the self-garbage collection-chunk can comprise groups of erasure coding strips and groups of mirror strips. Regarding the foregoing and in some illustrative embodiments, the second garbage collection process performed within the erasure coding strip included in the self-garbage collection-chunk can be a merge-way-garbage collection cross strip process.

Further, with respect to the foregoing, the erasure coding strip can conform to a code scheme that defines a correspondence pattern of a first number of erasure coding segments corresponding to a second number of parity segments.

In accordance with still further embodiments, the subject disclosure describes a machine-readable storage medium, a computer readable storage device, or non-transitory machine-readable media comprising instructions that, in response to execution, cause a computing system comprising at least one processor to perform operations. The operations can comprise: determining whether small object data has been deleted from a physical storage location associated with an erasure coding strip that is included in a self-garbage collection-chunk, clearing a bit of a group of bits from a usage bitmap, wherein the bit of the group of bits represents the physical storage location where the small object data is stored to the erasure coding strip, and wherein the usage bitmap is associated with the erasure coding strip, determining, based on the usage bitmap, that all bits of the group of bits representing an erasure coding segment of the erasure coding strip have not been cleared from the usage bitmap, executing a collapse garbage collection process within the erasure coding strip, and modifying a logical memory offset to a physical memory offset mapping based on a result of the executing of the collapse garbage collection process within the erasure coding strip.

The collapse garbage collection process can comprise: determining, using the usage bitmap, locations of a group of voids within the erasure coding strip segment of a collection of erasure coding strip segments associated with the erasure coding strip, wherein the group of voids separates a group of the small object data stored at different locations within the collection of erasure coding strip segments, removing the group of voids that separates the group of small object data at the different locations, coalescing and redistributing the group of the small object data to reduce a number of erasure coding strip segments of the collection of erasure coding strip segments occupied by the group of small object data, and updating the usage bitmap to reflect, in the usage bitmap, the coalescing and the redistributing of the group of small object data.

As noted above, ECS equipment/systems are known as being software-defined, scale-out object storage platforms designed to handle vast amounts of unstructured data across multiple locations. ECS equipment/systems provide corporate business entities with a cloud-like storage experience while enabling complete control over data and infrastructure. Some features of ECS systems/equipment are that they are seamlessly scalable to accommodate growing data needs; provide multi-protocol access, such as cloud-based object storage services, that allow users to store and retrieve any amount of data from anywhere on the web; use distributed file system protocols such as the network file system (NFS) protocol, and the like, for flexible data access; and facilitate geo-distribution by allowing data to be distributed across multiple locations for faster access. ECS systems/equipment can also provide data protection through the use of built-in erasure coding (EC) and replication to ensure data integrity; compliance and security using encryption, role-based access control, and audit logging; and typically optimizes storage costs by reducing the need for multiple separate storage systems.

A storage or memory garbage collection (GC) process is typically considered to be an automated process, which when in execution on one or more processors, is used to manage memory allocation and reclaim unused memory, preventing memory leaks and improving application efficiency. GC processes eliminate the need for manual memory management by automatically freeing up space occupied by objects that are no longer in use. Some key concepts concerning GC processes are that they can automatically perform memory reclamation, wherein a GC process in execution generally identifies and removes objects that are no longer being referenced. GC processes generally use heap memory management facilities/functionalities so that objects can be dynamically allocated/re-allocated, and can employ various methods/algorithms/processes to handle garbage collection, wherein each of these various methods/algorithms/processes can have disparate efficiency trade-offs.

Some illustrative garbage collection methods/algorithms/processes, to name a few, can include: reference counting (e.g., a technique that tracks the number of references to an object and deletes the object when the count reaches zero); mark and sweep (e.g., a method that identifies live objects by marking reachable ones and sweeping unreferenced objects), copying/stop-and-copy (e.g., a procedure that moves live objects to a new space while discarding the old memory); generational garbage collection (e.g., a method that divides objects into young, old, and permanent generations to optimize performance); and concurrent and parallel garbage collection (e.g., a technique that runs contemporaneously with application execution in order to minimize pause times).

For purposes of explosion, a memory chunk can be considered to be a contiguous block of memory allocated by a system for software or code in execution to use. Memory chunks are generally viewed as being fundamental units in memory management, allowing efficient allocation and de-allocation of resources.

Generally, chunks can be either a fixed predetermined size (e.g., the chunks are associated as memory pools, memory groups, collections of memory groups, etc.) or a variable size (e.g., the chunks are dynamically sized). Further, chunks when dynamically allocated, can be based on heap memory allocation invocations, such as the C/C++ coding memory allocation invocation malloc ( ) or the Java or C#allocation instantiation new. As will be appreciated by those having ordinary skill, improper chunk allocations and de-allocations can lead to internal fragmentation and/or external fragmentation. Pertaining to internal fragmentation there can be wasted space within chunks, and concerning external fragmentation free chunks can be scattered such that they cannot be easily merged. In the context of garbage collection and chunks, in programming languages that provide automatic resource allocation and/or garbage collection functionalities, chunks can be managed automatically. In coding languages that do not provide garbage collection facilities and/or that require manual resource allocation, more explicit resource allocation management is necessary.

In the realm of memory chunks there can be many types of chunk. For instance, stack memory chunks (e.g., small, fixed-size allocations used for function calls and local variables); heap memory chunks (e.g., dynamically allocated blocks, typically larger than stack memory chunks, managed by a program in execution or garbage collector process that is also in execution); and memory pool chunks (e.g., pre-allocated blocks used in high-performance applications to reduce allocation overhead).

The subject disclosure provides an approach to garbage collection (GC) within storage systems (e.g., storage equipment) by using an identified chunk type-"self-GC-chunk"—that enables GC processes in execution to perform GC within individual chunks. Currently, GC methods comprise writing multiple objects (e.g., data, metadata, files, unstructured data, and the like) into shared chunks. The current methodology however can present challenges often requiring the use of concepts associated with merge-way-GC.

Merge-way-GC is a technique used in memory management where multiple lists or pools of free memory blocks (chunks) are merged efficiently to reduce fragmentation and improve memory reuse. The approach is particularly useful in generational garbage collection and parallel/concurrent GC systems, where memory is divided into multiple segments or generations. Key concepts associated with the merge-way-GC technique is that while merge-way-GC processes are operational they maintain records associated with determined free memory blocks/chunks, and based on the maintained records associated with the determined free blocks/chunks, merge adjacent free memory chunks/blocks to create larger contiguous chunks/blocks (e.g., merges free memory blocks/chunks). Further, the merge-way-GC technique generally reduces fragmentation by coalescing smaller free space into larger free space, thereby improving allocation efficiency (e.g., efficient memory reclamation). Additionally, the technique can involve merging, in parallel, multiple lists free memory blocks/chunks from different regions and/or processing threads.

In overview an illustrative merge-way-GC process, when in execution, can operate in the following manner: (i) the merge-way-GC process scans memory resources and identifies unused objects (e.g., an identification act); (ii) merges adjacent free chunks/blocks into larger contiguous agglomerations of free chunks/blocks (e.g., a coalescing act); and (ii) adds the now larger contiguous agglomerations of free chunks/blocks into even greater aggregations of contiguous agglomerations of free chunks/blocks for future memory/resource allocation (e.g., a reallocation act).

To address the challenges that can be posed by writing multiple objects into shared chunks and overcoming the complexities in the GC process, the disclosed and proposed self-GC-chunk design allows for efficient GC operations within the self-GC-chunk. By using the detailed self-GC-chunk design and providing GC operations within the self-GC-chunk itself, overhead associated with traditional merge-way-GC processes can be significantly reduced, thereby offering a more streamlined and localized approach to managing resources, such as disk space reclamation. Thus, by implementing the disclosed and described self-GC-chunks, lower GC overhead can be achieved, and stable chunk locations can be maintained, even during internal GC operations.

Typically, ECS equipment can have a shared chunk storage layer which uses 128 Megabyte (M) chunks. A logical 12+4 erasure coding (EC) chunk can therefore comprise 16 physical disk blocks distributed across equipment (e.g., storage devices/equipment) comprising the ECS equipment. Each of the 16 physical disk blocks can generally be sized at approximately 10.6 M. For storage efficiency, objects that are generally less than 128 M (e.g., <128 M) can be written to one shared chunk.

Nevertheless, by writing objects of this magnitude (e.g., approaching 128 M) can impose more complexity to GC processes. Typically, it cannot always be assumed that all objects can be deleted within the whole shared chunk in order to reclaim resource space (e.g., memory space, disk space, and the like). In many instances, only a portion of chunk space is deleted yielding a partially empty (e.g., partially free) chunk. To remedy this issue, the current technology uses merge-way-GC processes in execution to write or transfer objects extant in partially empty chunks to new chunk instances, and thereafter to delete, from the partially empty chunks, the written/transferred objects, that should now exist in new chunk instances.

As has been observed earlier, merge-way-GC can be significantly complex and can impose considerable overheads to the system. For instance, persistent chunk reverse reference information needs to be acquired and maintained. There can be a need to maintain and augment object range to chunk range tables in object metadata, and often there is need for other chunk range usage tables. Also, chunk occupation ranges need to be updated when creating and deleting objects from chunk instances, and used and/or deleted ranges for each chunk need to be monitored and tracked. Generally, ECS equipment can use key-value (KV) clusters to record such information. Such KV clusters can be required because create/delete acts generally need to also be updated. Further, other KV object metadata can require more effort to maintain the transaction by using two distributed KV tables. Furthermore, the use of merge-way-GC processes can have large overheads as it needs to read data from memory/disk resources and write the read data to new chunk instances. Also, parity segments associated with chunks need to be recomputed and written as necessary.

Once merge-way-GC has moved candidate chunks to new chunk instances, chunk locations (e.g., chunk-ids, offsets, lengths, and the like) need to be changed/modified/adjusted. ECS equipment persists chunk locations in object metadata KV, so metadata KV need to be updated with new chunk locations, which can continue to generate b-tree structures (e.g., a self-balancing tree data structure that maintains sorted data and allows searches, sequential access, insertions, and deletions in logarithmic time) and write ahead and log garbage.

For purposes of elucidation, a chunk-strip can be protected by erasure coding (e.g., a fault tolerant data protection mechanism used to efficiently store and recover data while reducing storage overhead) or by mirroring (e.g., creating exact duplicates and/or replicas of data, storage, and/or, as the case may be, systems (e.g., virtual machine instances)). The size of a chunk-strip segment can be configurable so values of 512 kilobytes (K), 256K, or smaller, can be viable candidates for chunk-strip segment sizes. Typically, a chunk-strip segment size can be based on a maximum input output (IO) size in a single request. Thus, a common size range can be between 64K-2 M.

Figure 4:
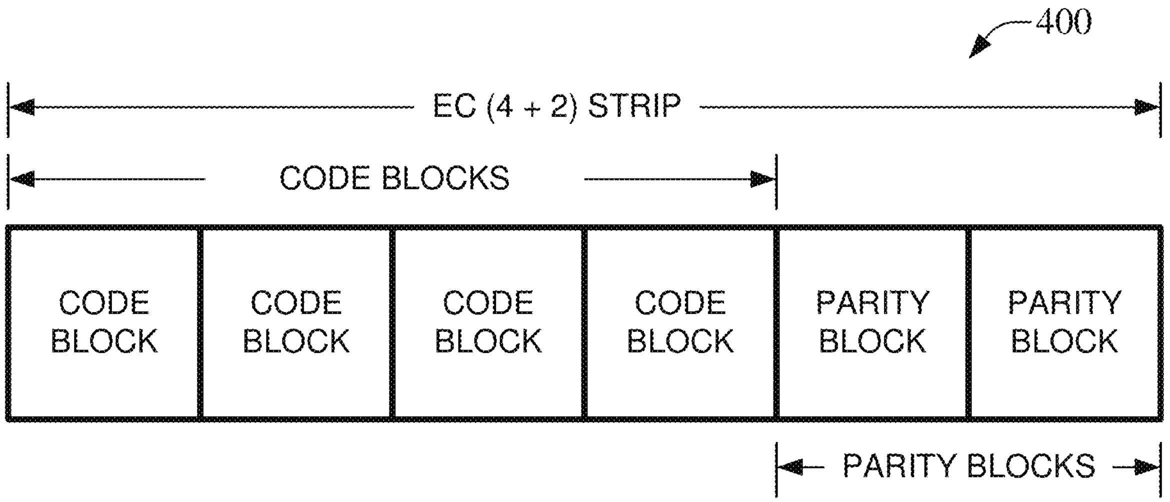
FIG. 4 depicts an example erasure coding (EC) strip associated with a self-GC-chunk as used to perform GC within a self-GC-chunk, in accordance with various non-limiting example embodiments.
Figure 5:
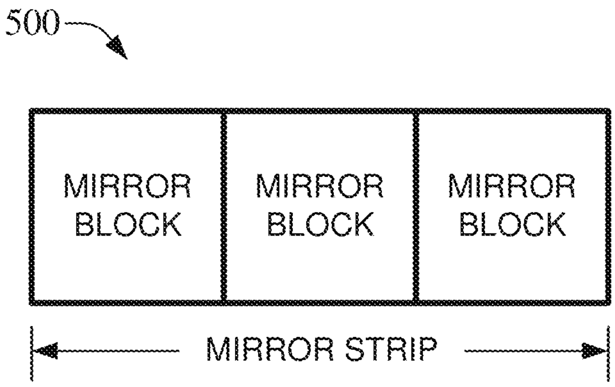
FIG. 5 illustrates an example mirror strip associated with a self-GC-chunk as used to perform GC within a self-GC-chunk, in accordance with various non-limiting example embodiments.

For purposes of this disclosure it will be assumed that a 1 M disk block is representative of a strip segment. FIG. 4 provides illustration of an example 4M EC strip 400 with a 4+2 code scheme, and FIG. 5 provides depiction of an example mirror strip 500. As will be observed in reference to FIG. 4, EC strip 400 can comprise four 1 M code blocks/segments and two 1 M parity blocks/segments, thus representing and being compliant with a 4+2 code scheme. It should also be noted that the four 1 M code blocks/segments and the two 1 M parity blocks/segments form a unified contiguous memory block representative of EC strip 400, using a 4+2 code scheme. The capacity of EC strip 400 can be determined based on the code scheme number of the EC scheme (e.g., 4+2). It should be noted that while this application is being detailed in terms of 4+2 EC strips, the disclosure is not so limited, as other viable code number schemes can be used with equal facility and/or functionality, such as a 12+4 code scheme, wherein EC strips using this coding scheme can comprise a contiguity of twelve 1 M code blocks/segments and four 1 M parity blocks/segments; a code number scheme of 17+3, wherein the EC strips can comprise a contiguity of seventeen 1 M code blocks/segments and three 1 M parity blocks/segments.

Concerning mirror strip 500, depicted in FIG. 5, can comprise three 1 M mirror blocks/segments. In regard to mirror strips, each of the mirror blocks/segments that comprise mirror strip 500 generally have a capacity of 1 M capacity, no matter and regardless of how many copies there are. Thus, mirror strip 500, as depicted and described herein, has a contiguous capacity block length of 3 M.

Figure 3:
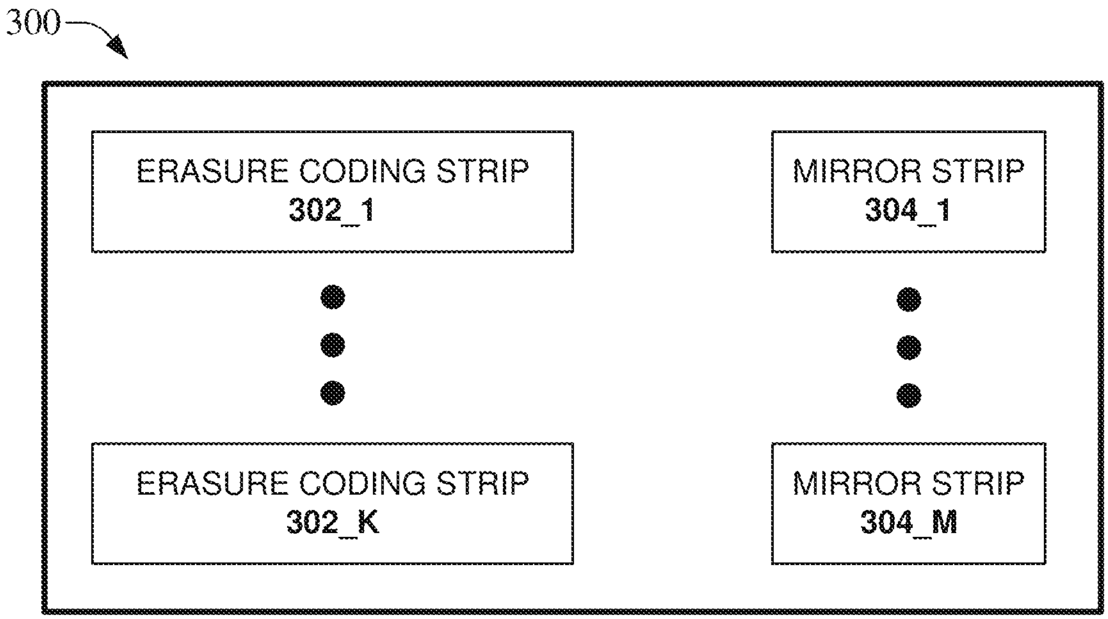
FIG. 3 illustrates a self-GC-chunk used to perform GC within a self-GC-chunk, in accordance with various non-limiting example embodiments.

In accordance with various example embodiments, FIG. 3 illustrates a self-GC-chunk 300 that can be used to perform garbage collection (GC) within the self-GC-chunk 300. As illustrated, self-GC-chunk 300 can comprise groups of erasure coding (EC) strips (e.g., EC strip 302_1 . . . . EC strip 302_K, where in K represents a positive integer value greater than 0) and mirror strips (e.g., mirror strip 304_1 . . . mirror strip 304_M, where M represents a positive integer value greater than 0). As depicted self-GC-chunk 300 can comprise a mix of both groups of EC strips as well as groups of mirror strips. For ease of exposition, groups of EC strips can be collectively referred to as groups of EC strips 302 and groups of mirror strips can collectively be referred to as groups of mirror strips 304. To be succinct, self-GC-chunk 300, as a unit entity, can include multiple groups of EC strips 302 as well as multiple groups of mirror strips 304. Concerning the size of self-GC-chunk 300 this can be determined and/or based on the number of groupings of EC strips 302 and the number of groupings of mirror strips 304 that comprise self-GC-chunk 300. Nevertheless, the capacity of a self-GC-chunk 300 can reach approximately about 4 Gigabytes (GB), wherein the approximately 4 GB value can be reflective of the metadata size of typical chunk data. Concerning FIG. 3, it should be noted that while self-GC chunk 300 has been depicted as comprising consecutive EC strips 302 (e.g., EC strip 302_1 . . . . EC strip 302_K) and consecutive mirror strips 304 (e.g., mirror strip 304_1 . . . mirror strip 304_M), this need not be the case. In certain embodiments, EC strips 302 can be randomly intercalated and interspersed with mirror strips 304. Thus, in some described embodiments one or more mirror strip 304 can randomly precede at least one EC strip 302. Similarly, in other embodiments, an EC strip 302 can be followed by one or more mirror strip 304, which can subsequently be followed a random ordering of EC strips 302 and/or mirror strips 304.

In order to write objects into the self-GC-chunk 300, for example, objects larger that an EC strip size can be written to an EC strip chunk. For instance, in some embodiments, an EC strip size can be 4 M, thus objects that are larger than 4 M can be written to one or more EC strips (e.g., EC strip 400), wherein the one or more EC strips can represent an EC strip chunk. Thus, for instance, an object that exceeds 4 M can be written to a first EC strip and a second EC strip, wherein the first EC strip and the second EC strip can be contiguous with one another, and wherein the first EC strip and the second EC strip can be considered to represent an EC strip chunk. When an object is deleted from the EC strip chunk, the EC strip chunk comprising the first EC strip and the second EC strip can be deleted and the EC strip chunk (e.g., the contiguous resource space utilized by the first EC strip and the second EC strip (e.g., the EC strip chunk) can be reclaimed as a contiguous whole. Generally, in relation to objects that exceed the EC strip size (e.g., 4M), object data can be written directly to EC strips during the course of write operations.

Figure 6:
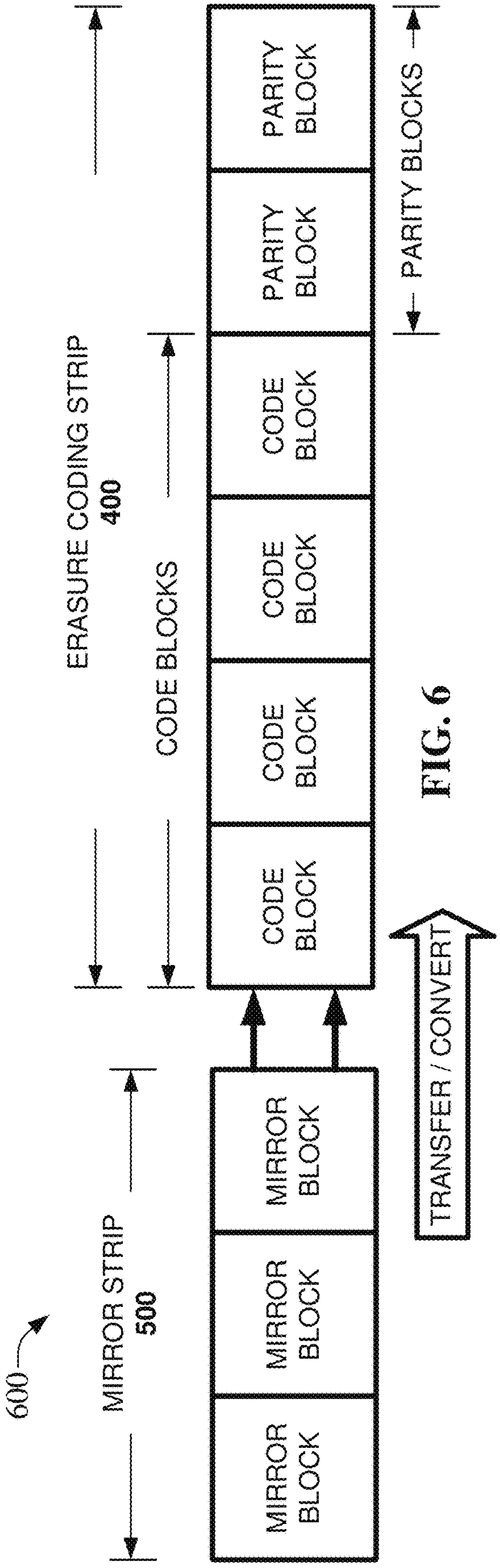
FIG. 6 depicts a visual chart illustrating how small object data can initially be written to a mirror strip associated with a self-GC-chunk, and subsequently can be transferred from the mirror strip to an EC strip associated with the self-GC-chunk, in accordance with various non-limiting example embodiments.

In instances where there are one or more small objects, wherein the sizes of the one or more small objects do not generally exceed the EC strip size (e.g., 4M) these one or more small objects can be written to one shared self-GC-chunk (e.g., self-GC-chunk 300). Here, as illustrated in FIG. 6, the one or more small objects can initially be written to a first mirror strip of the mirror strips 500. When at least the first mirror strip of the mirror strips 500 have been filled with small object data, code in execution on ECS equipment can move/transfer the small object data written to the at least first mirror strip to a first EC strip 400. The code in execution on ECS equipment, in some embodiments, can be a background process that at defined periodic time intervals transitions from a first state (e.g., a hiatus state/hibernation state/stop state, etc.) to a second state (e.g., working state/executing state, and the like). In alternative embodiments, the code in execution can be in a partially awakened state, where the code in execution, via one or more monitoring processes in execution, constantly (and/or sporadically) monitors whether the processes that are writing small objects to the first mirror strip of the mirror strips 500 have commenced writing small object data into a subsequent definable mirror strip of the mirror strips 500, at which point the code in execution can commence moving/transferring the small object data written to the at least first mirror strip to a first EC strip 400. It should be noted that when code in execution that is in the partially awakened state monitoring the processes associated with writing small object data into the first mirror strip of the mirror strips 500, since, in this embodiment, there are but three mirror strips that comprise mirror strips 500, the point at which the code in execution is placed into a fully awakened state can be variably defined based on a rate at which the mirror strips are being filled up with small object data. For instance, where the rate at which the first mirror strip of the mirror strips 500 is low, the point at which the code in execution transitions from being in the partially awake state to the fully awakened state can be set to be the point at which a second mirror strip of the mirror strips 500 has completed filling the second mirror strip of the mirror strips 500. In instances where the rate at which the first mirror strip of the mirror strips 500 is high, the point at which the code in execution transitions from being in the partially awake state to the fully awakened state can be set to be a mid point at which the first mirror strip has completed filling the first mirror strip of the mirror strips 500 with small object data. Concerning the rate at which the first mirror strip of the mirror strips 500 is being filled with small object data, this rate can be representative of, and determined as, a rate of change in the quantum of small object data being written into mirror strips 500 during a measured/determined/defined period of time. Moreover, should during the course of writing the small object data to one of the mirror strips 500 the rate of change in the quantum of small object data being written into mirror strips 500 slacken or increase, the point at which the code in execution is brought back into a fully awakened state can be adjusted to account for the updated/changed circumstances.

In regard to the foregoing. it will be appreciated by those having ordinary skill in the art that there can be a significant space saving through practical use of the detailed subject matter. For example, in some embodiments, where it is assumed that a disk block size is 1 M, a mirror block of a mirror strip 304 can therefore store 1 M of user data, and a 4+2 EC strip 302 can store 4 M of user data with an additional 2 M being used for parity. This implies that four mirror strips (4 M) can be converted into one EC strip (e.g., 4+2), which can thus result in a space saving of: 4 (mirror data)*3 (replication factor)-4 (EC data)-2 (EC partity)=6 M of raw disk space saved.

Figure 7:
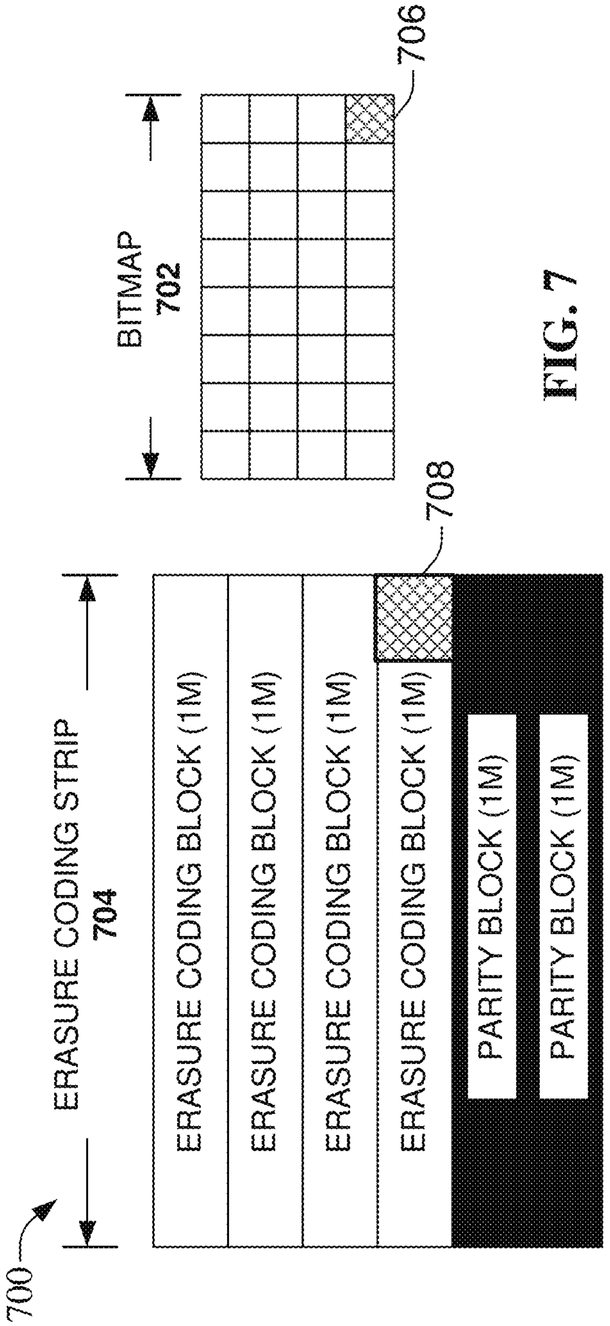
FIG. 7 depicts an EC strip and a usage bitmap associated with the EC strip as used to perform GC within a self-GC-chunk, in accordance with various non-limiting example embodiments.

Once small object data has been transferred/moved from one or more mirror strips 500 to EC strip 400 (e.g., the code blocks included in EC strip 400), as illustrated in FIG. 7, a usage bitmap (e.g., bitmap 702) can be associated with EC strip 400 (now labeled as EC strip 704). FIG. 7 illustrates an EC strip 704 in association with a usage bitmap 702 (collectively called-out as item 700) for performing garbage collection (GC) within a self-GC-chunk, in accordance with various example embodiments. Each EC strip 704 included in a self-GC-chunk can be associated with a usage bitmap 702. As illustrated, each EC strip 704, as has been observed above, and in accordance with a 4+2 code scheme, can comprise four 1 M code blocks/segments and two 1 M parity blocks/segments. Thus, since each 1 M code block/segment is sized as being 1 M, one bit 706 in usage bitmap 702 can represent 16 kilobytes (K) (e.g., 708) in EC strip 704, and as such the bitmap size representing the EC strip 704 can, for example, be 4*(1024K/16K)=256 bits=32 bytes. Nevertheless, in some embodiments one bit associated with usage bitmap 702 can also be used to manage/map smaller sizes associated with EC strip 704. In regard to bitmap 702 it should be observed that each bit that comprises bitmap 702 generally cannot be shared, and typically can only reference small object data associated with one small object.

It should be noted in connection with the parity blocks associated with the EC strip (e.g., EC strip 704), that small object data is generally never transferred/moved into the parity blocks; these parity blocks are still reserved for their original purpose-checking for errors associated with small object data persisted to EC strips. Accordingly, the two parity blocks, depicted in association with EC strip 704 and illustrated in FIG. 7, are shaded out.

FIG. 1 depicts a system 100 for optimizing data archival in accordance with various example embodiments, in accordance with various non-limiting example embodiments. System 100, for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 100 can include tablet computing devices, handheld devices, server class computing equipment, machines, and/or database equipment, laptop computers, notebook computers, desktop computers, cell phones, smart phones, consumer appliances and/or instrumentation, industrial devices and/or components, hand-held devices, personal digital assistants, multimedia Internet enabled phones, Internet of Things (IOT) equipment, multimedia players, and the like.

System 100 can comprise garbage collector engine (e.g., collector engine 102) that can be in operative communication with processor 104, memory 106, and storage 108. Collector engine 102 can be in communication with processor 104 for facilitating operation of computer-executable instructions or machine-executable instructions and/or components by collector engine 102; memory 106 for storing data and/or computer-executable instructions and/or machine-executable instructions and/or components; and storage 108 for providing longer term storage of data and/or machine-readable instructions and/or computer-readable instructions. Additionally, system 100 can also receive input 110 for use, manipulation, and/or transformation by collector engine 102 to produce one or more useful, concrete, and tangible results, and/or transform one or more articles to different states or things. Further, system 100 can also generate and output the useful, concrete, and tangible result and/or the transformed one or more articles as output 112.

Figure 2:
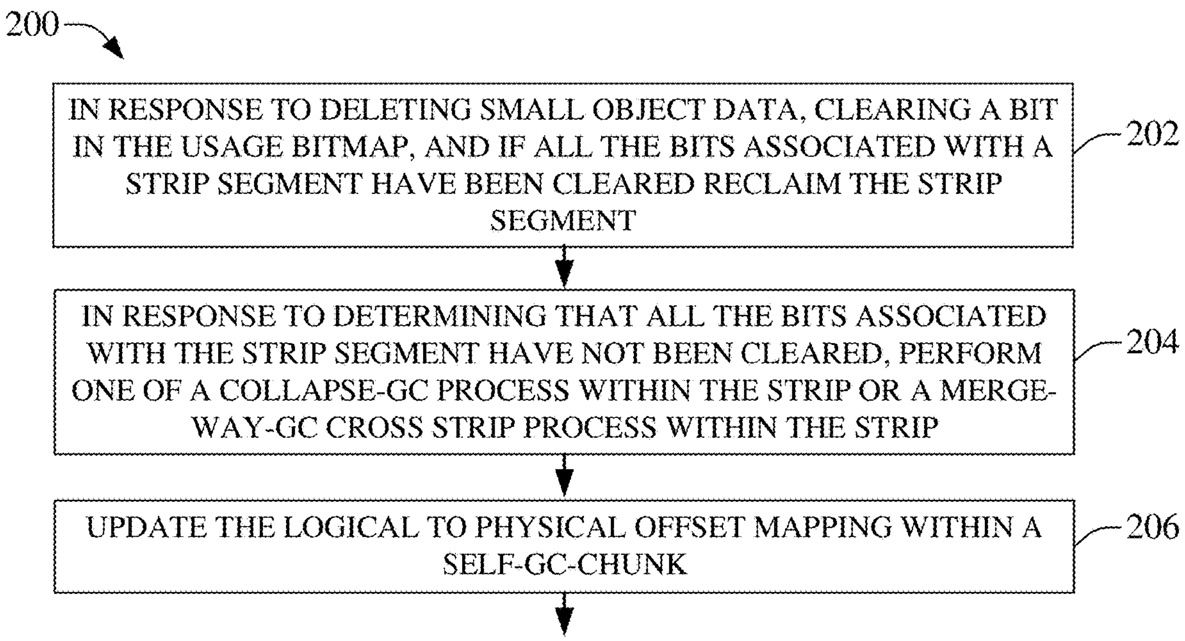
FIG. 2 illustrates a method, flow chart, or time sequence, for performing GC within a self-GC-chunk, in accordance with various non-limiting example embodiments.

In reference to FIG. 2 that depicts an example method 200 for performing GC within a self-GC-chunk, in accordance with various detailed example embodiments, at act 202, and in response to deleting small object data from an EC strip (e.g., EC strip 704), collector engine 102 can clear the bit representing the deleted small object data from the usage bitmap (e.g., usage bitmap 702) associated with the EC strip (e.g., EC strip 704). Thereafter, the EC strip segment (e.g., the 1 M) can be recovered in its entirety and can be reclaimed provided that all the bits in the associated usage bitmap 702 have been cleared. Contemporaneously, and/or in near contemporaneity, with the deleting of the small object data from the EC strip, clearing the bit(s), representing the deleted small object data from the EC strip, from the usage bitmap 702, and should the entirety of the 1 M EC strip segment be determined to be clear of small object data associated with the cleared bit, the parity segments associated with the EC strip (and/or the pertinent 1 M EC strip segment) can be recalculated and appropriately updated.

Figure 8:
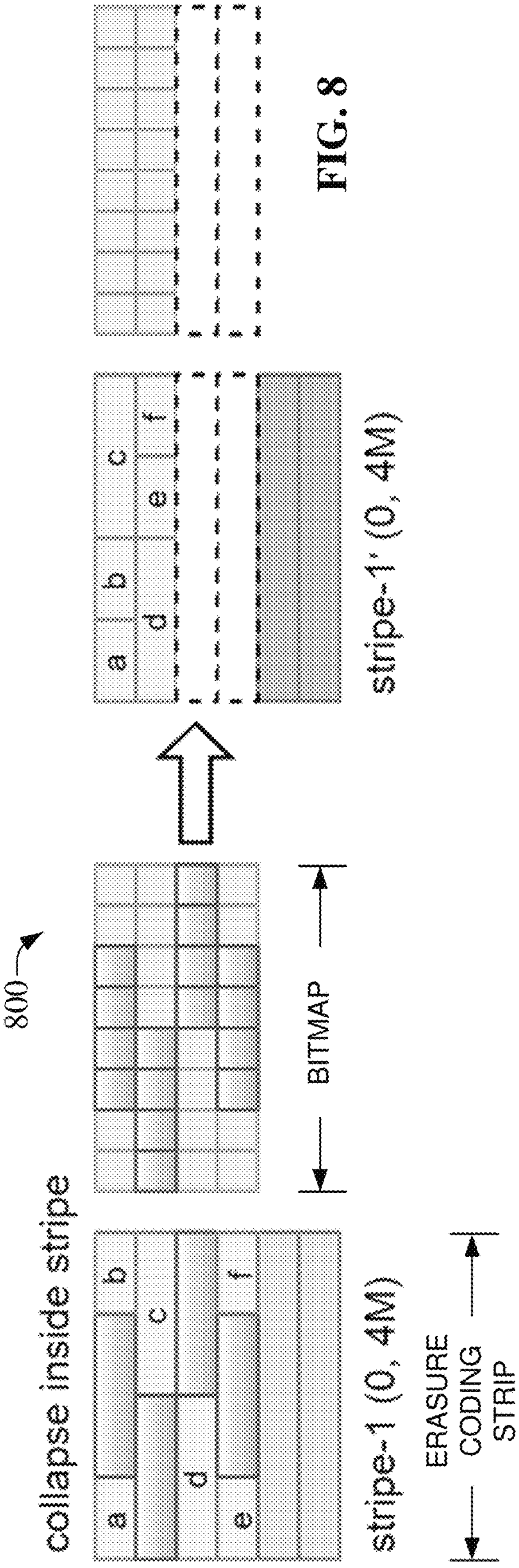
FIG. 8 is a visualized sequence diagram depicting collapse-GC inside an EC strip, in accordance with various non-limiting example embodiments.

At act 204, in accordance with some embodiments of set forth in this disclosure, where it is determined, via usage bit data, that the 1 M EC strip segment has only been partially freed of small object data, as depicted in FIG. 8, a compression act (e.g., collapse garbage collection algorithm) can be performed where data extant within the entirety of EC strip (e.g., EC strip 704) can be marshaled/collected/grouped into fewer 1 M EC strip segments. Illustration of the compression act that can be performed, at act 204, by collection engine 102, is depicted in FIG. 8.

FIG. 8 illustrates an example sequence of events 800 that can take place when compressing/collapsing the EC strip (e.g., EC strip 704) and its associated usage bitmap (e.g., usage bitmap 702). As depicted, the EC strip (e.g., strip-1 (0, 4 M)) comprising four 1 M EC strip segments/blocks, can be partially filled with small object data (e.g., first small object data (a), second small object data (b), third small object data (c), fourth small object data (d), fifth small object data (e), and sixth small object data (f)). It will be observed the small object data (e.g., first small object data (a), second small object data (b), third small object data (c), fourth small object data (d), fifth small object data (e), and sixth small object data (f)) is dispersed over each EC strip segment of the four EC strip segments that can comprise the EC strip. Thus, first small object data (a) and second small object data (b) are stored at opposite ends of the first EC strip segment, leaving a void (e.g., an absence of small object data) between the representations associated with first small object data (a) and second small object data (b). Similarly, the second EC strip segment comprises an initial void (e.g., hole) followed by third small object data (c) at the end of the second EC strip segment, the third EC strip segment comprises fourth small object data (d) followed by a void at the end of the third EC strip segment, and the fourth EC strip segment comprises fifth small object data (e) at the beginning of the fourth EC strip segment followed by an intervening void which in turn is followed by sixth small object data (f). The small object data occupation realities associated with the EC strip is exactly reflected and mirrored in the usage bitmap associated with the EC strip.

Now at act 204, in some embodiments, when collection engine 102 collapses or decompress the EC strip (e.g., strip-1 (0, 4 M)), removing the voids that were earlier present, the result is a modified EC strip (e.g., strip-1' (0, 4 M)). It will be observed that the modified EC strip (e.g., strip-1' (0, 4 M)) has shifted the first small object data (a), second small object data (b), third small object data (c), fourth small object data (d), fifth small object data (e), and sixth small object data (f) to now reside contiguously within the first EC segment and the second EC segment, and that the various voids that were once interspersed/interspaced/interwoven between the various small object data have been removed. It will also be noted that after performance by collection engine 102 of act 204 that two of the EC strip fragments of the EC strip have been freed up (e.g., indicated by dotted boundaries). It will also be observed with reference to modified EC strip (e.g., strip-1' (0, 4 M)) that the small object data has been arranged to reside contiguously within the first two strip fragments of the EC strip, and that the second two strip fragments of the EC strip comprise contiguous free space—there is no small object data in the third and fourth strip fragments of the EC strip (e.g., e.g., strip-1' (0, 4 M)).

In some additional and/or alternative embodiments, collection engine 102, at act 204, rather than collapsing or compressing the EC strip at noted and outlined above, can alternatively perform a process termed merge-way GC cross strip. In these example embodiments, and with reference to FIG. 9, collection engine 102 can merge a continue EC strip into a new EC strip, and thereafter reclaim the original EC strips. The candidate strip must be continued so that the order persistence of the small object data within the EC strips is maintained once the merging act has occurred.

Figure 9:
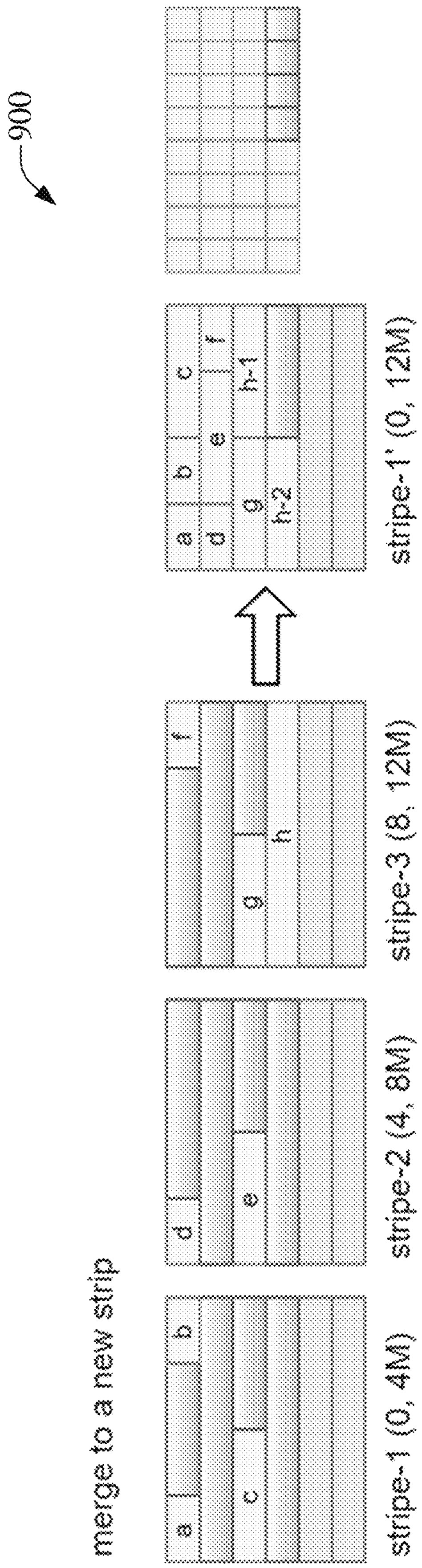
FIG. 9 is a further visualized sequence diagram illustrating a merge-way-GC cross strip process used inside an EC strip, in accordance with various non-limiting example embodiments.

FIG. 9 depicts an example sequence of occurrences 900 that can occur when collection engine 102 performs acts associated with the aforementioned merge-way GC cross strip algorithm. As illustrated, three distinct EC strips (e.g., strip-1 (0, 4 M), strip-2 (4, 8 M), and strip-3 (8, 12 M)) can be used facilitate and/or effectuate the merge-way GC cross strip maneuvering scheme.

As depicted in FIG. 9, the first EC strip (e.g., strip-1 (0, 4 M)) comprising four 1 M EC strip segments/blocks can be partially filled with small object data (e.g., first small object data (a), second small object data (b), and third small object data (c)), wherein first small object data (a) and second small object data (b) are positioned at opposite ends of the first EC strip segment of the first EC strip (e.g., strip-1 (0, 4 M)), leaving a void between the first small object data (a) and the second small object data (b). It will also be observed that the entirety of the second EC strip segment of the first EC strip (e.g., strip-1 (0, 4 M)) is also void (e.g., is a hole). In this regard, it will also be noted that the entirety of second EC strip segment associated with the second EC strip (e.g., strip-2 (4, 8 M)), and the entirety of the second EC strip segment associated with the third EC strip (e.g., strip-3 (8, 12 M)) are also entirely devoid of small object data (e.g., are holes).

Briefly returning back to the first EC strip (e.g., strip-1 (0, 4 M)), it will be observed that third small object data (c) can occupy a first portion of the third EC strip segment of the first EC strip (e.g., strip-1 (0, 4 M)) and that the fourth EC strip segment associated with the first EC strip (e.g., strip-1 (0, 4 M)), like the second EC strip segment of the first EC strip (e.g., strip-1 (0, 4 M)), is also devoid of small object data.

With reference to the second EC strip (e.g., strip-2 (4, 8 M)), fourth small object data (d) can have been placed at the beginning of the first EC strip segment of the second EC strip (e.g., strip-2 (4, 8 M)) after which the remainder of the first EC strip segment of the second EC strip (e.g., strip-2 (4, 8 M)) is void of small object data. Further, as stated above, the second EC strip segment of the second EC strip (e.g., strip-2 (4, 8 M)) can also be void in its entirety of small object data. Concerning the third EC strip segment of the second EC strip (e.g., strip-2 (4, 8 M)), the initial portion of the third EC strip segment of the second EC strip (e.g., strip-2 (4, 8 M)) can contain fifth small object data (e), after which the fourth EC strip segment of the second EC strip (e.g., strip-2 (4, 8 M)) can contain no small object data (e.g., the fourth EC strip segment of the second EC strip does not have small object data persisted to it and this is void/empty).

A similar pattern of data voids (e.g., where small object data has not been stored/persisted) and locations where small object data has been persisted, is illustrated in the context of the third EC strip (e.g., strip-3 (8, 12 M)). As illustrated in FIG. 9, third EC strip (e.g., strip-3 (8, 12 M)), and as is true for both first EC strip (e.g., strip-1 (0, 4 M)) and second EC strip (e.g., strip-2 (4, 8 M)), comprising four 1 M EC strip segments/blocks associated with two 1 M parity segments/blocks typical of a 4+2 coding scheme, can have stored thereto sixth small object data (f), seventh small object data (g), and eight small object data (h). In regard to the third EC strip (e.g., strip-3 (8, 12 M)) the sixth small object data (f) can have been persisted to the end of the first EC strip segment of the third EC strip (e.g., strip-3 (8, 12 M)), the seventh small object data (g) and the eight small object data (h) can have been respectively stored to the third EC strip segment associated with the third EC strip (e.g., strip-3 (8, 12 M)), and the fourth EC strip segment of the third EC strip (e.g., strip-3 (8, 12 M)). As will have been observed, the seventh small object data (g) has been persisted to a first portion of the third EC strip segment of the third EC strip (e.g., strip-3 (8, 12 M)) and the eight small object data (h) has been stored to the entirety of the fourth EC strip segment of the third EC strip (e.g., strip-3 (8, 12 M)).

Collector engine 102, at act 204, and in accord with the described merge-way GC cross strip algorithm, can rearrange the various small object data (e.g., first small object data (a) to eight small object data (h)) to remove all the interleaved voids and form a resultant coalescent contiguity of small object data (e.g., strip-1' (0, 12 M)) and its associated usage bitmap that provides indicative representation of the location of each small object data within the coalescent contiguity of small objects (e.g., strip-1' (0, 12 M)).

Figure 10:
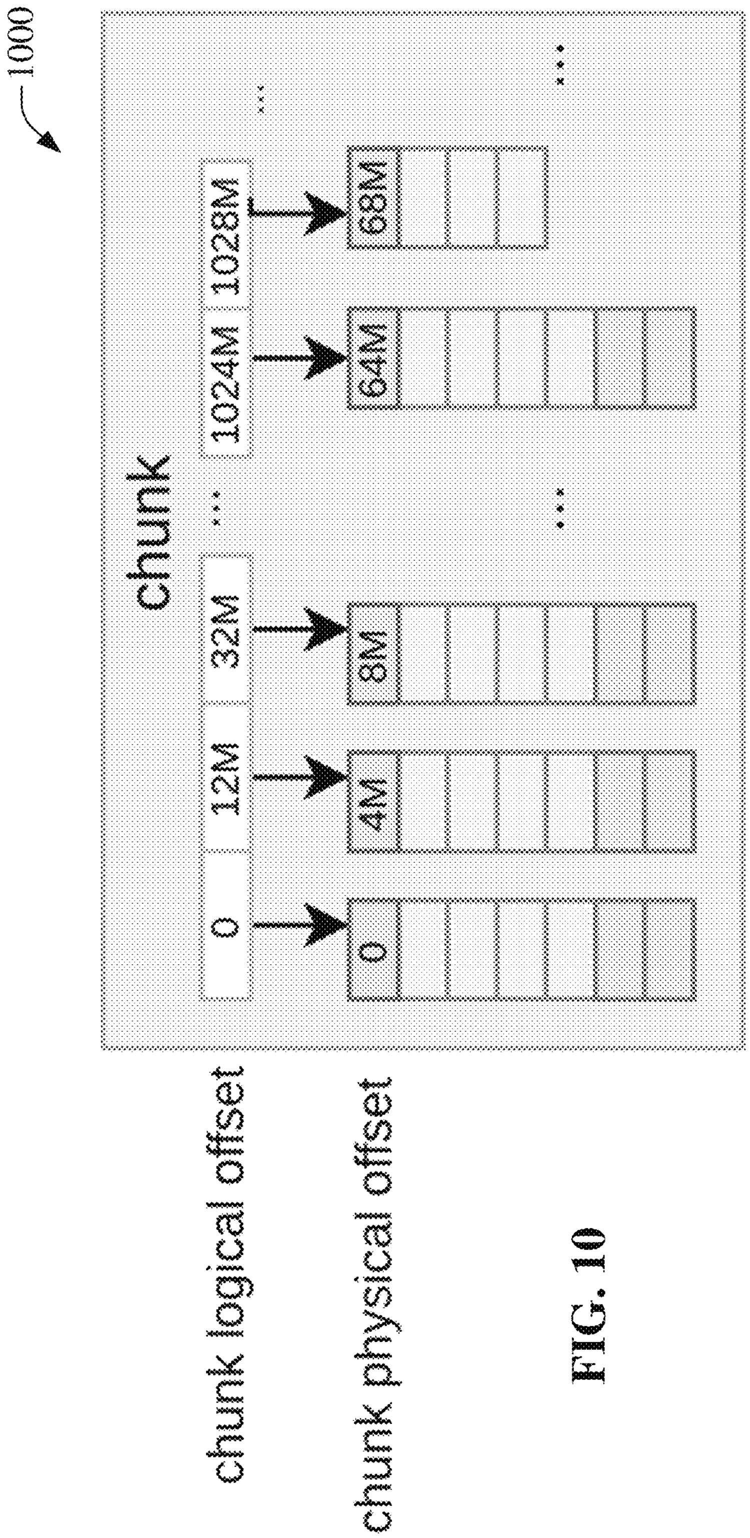
FIG. 10 illustrates using logical and physical offsets to update and/or maintain self-GC-chunk and EC strip memory management, in accordance with various non-limiting example embodiments.

In regard to the collapse garbage collection algorithm and the merge-way GC cross strip algorithm that can be used by collector engine 102 at act 204, these algorithms can leave a hole in the logical chunk content. To resolve this issue, collector engine 102 at act 206 can update and maintain a mapping between a chunk logical offset to a chunk physical offset within the self-GC-chunk and its associated EC strips. As illustrated in FIG. 10 a chunk layer can be used, by collector engine 102, to determine an EC strip (and its associated EC strip segments/blocks) within the self-GC-chunk based on a logical offset associated with the EC strip and the self-GC-chunk. As will be observed, the logical offset can be larger than the physical offset due to the fact that small object data can have been deleted from the self-GC-chunk leaving void spaces as detailed above.

Figure 11:
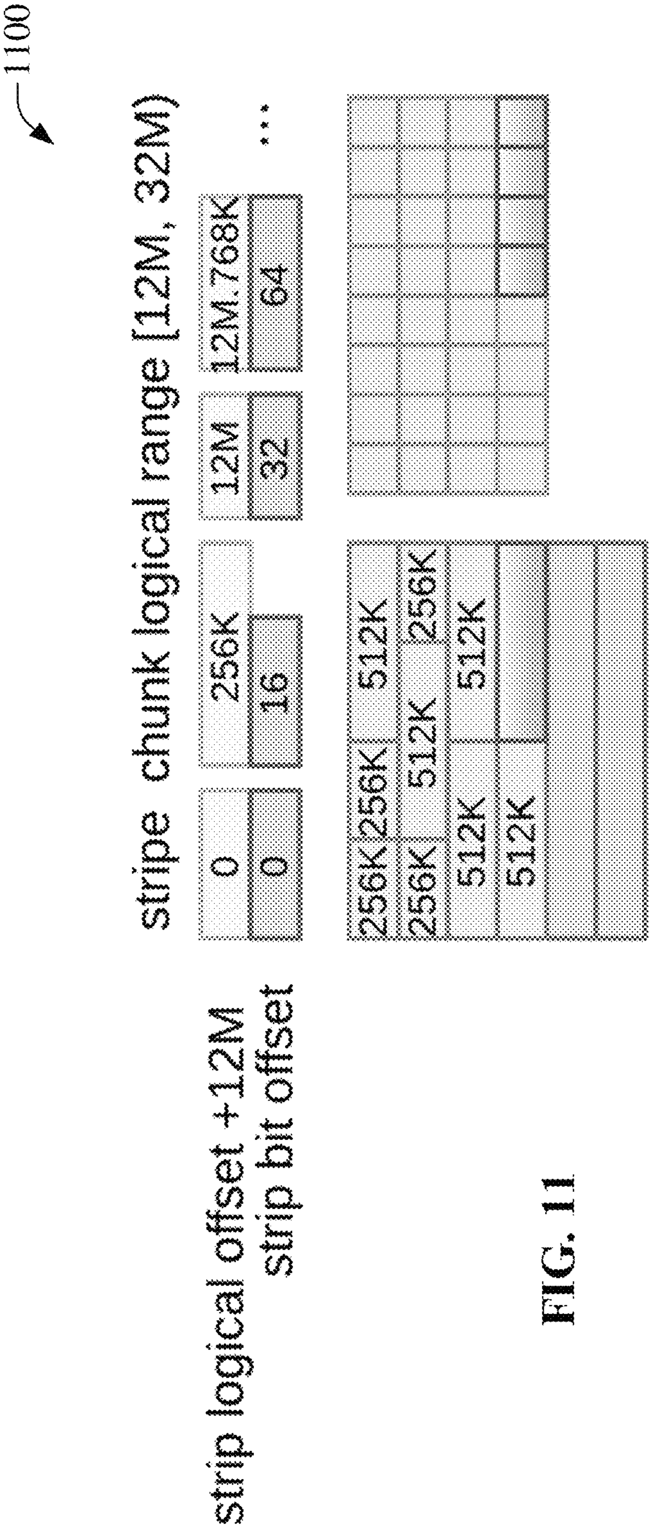
FIG. 11 illustrates using logical and physical offset to update and/or maintain self-GC-chunk and EC strip memory management, in accordance with various non-limiting example embodiments.

Further, with reference to FIG. 11, collection engine 102, by drilling down to the EC strip layer, can obtain a continuous record of the chunk logical offset to the EC strip bit offset. The offset mapping can be persisted to two arrays of bytes, all values can have an ascending order, and as such collection engine 102 can use binary searches to reduce the overhead associated with a find operation.

Concerning the impact of the subject disclosure on storage media such as hard disk equipment and/or solid state equipment, hard disk equipment typically has 4K or 8K physical sector sizes, the sectors can be overridden. The disk block can be picked up and reused immediately after a software layer reclaims the disk block.

In relation to solid state equipment, solid state equipment generally exposes the software stack using a logical offset. After the software stack reclaims a block, the solid state equipment typically depends on its flash translation layer (FTL) to perform FTL-garbage collection, after which a physical cell can be reused again. Since FTL-garbage collection is commonly transparent to the software stack, functionality is seldom impacted. Solid state equipment normally has a physical indirection (IU) size of 4K, more modern and larger solid state equipment can use 16K or 32K IU sizes. In regard to the FTL layer, this is hardware/software layer situated in the controller of peripheral based on flash memory, such as solid state drives (SSDs), universal serial bus (USB) key devices, secure digital (SD)/multimedia cards (MMC) (SD/MMCs), and embedded multimedia cards (eM M Cs).

It will be appreciated by those skilled in the art that the preceding examples and embodiments are exemplary and not limiting to the scope of the present disclosure. It shall also be noted that elements of any claims may be arranged differently including having multiple dependencies, configurations, and combinations.

In view of the example embodiment(s) described above, the foregoing example method(s) or process(es) can be implemented in accordance with the disclosed subject matter. It is to be appreciated with regard to the described and detailed methods, flowcharts, and/or illustrative time sequence charts and for purposes of simplicity of explanation, a example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 12:
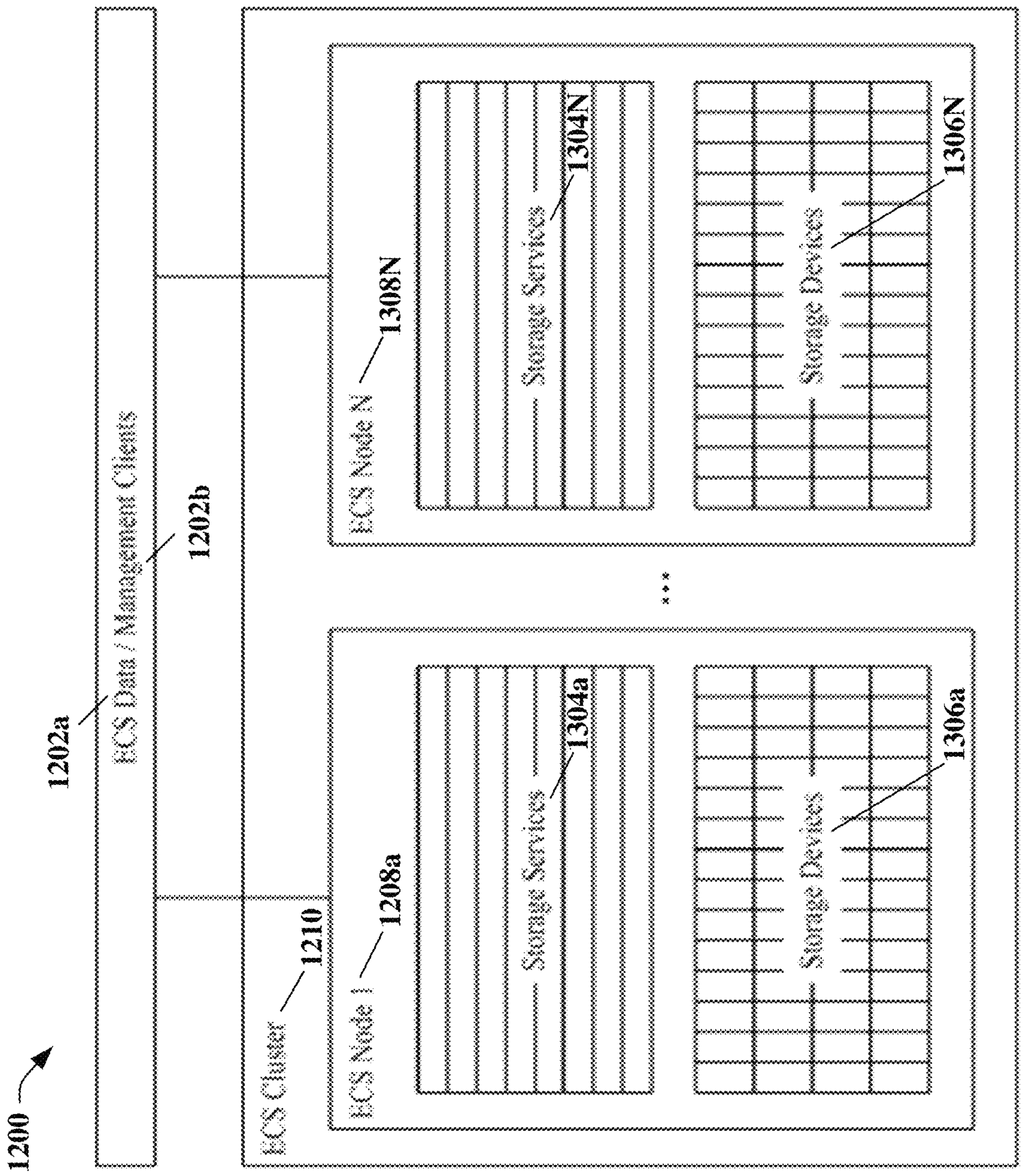
FIG. 12 illustrates a cloud storage system, such as an elastic cloud storage (ECS) system, in accordance with various non-limiting example embodiments.

In the following, FIG. 12 describes an example non-limiting cloud storage system in the non-limiting context of an ECS storage system, but for the avoidance of doubt, the subject embodiments can apply to any storage platform. For instance, in this regard, FIG. 12 illustrates an ECS storage system 1200 comprising a cloud-based object storage appliance in which corresponding storage control software comprising, e.g., ECS data client(s) 1202*a*, ECS management client(s) 1202*b*, storage service(s) 1204*a* . . . 1204N, etc. and storage devices 1206*a* . . . 1206N (e.g., storage media, such as physical magnetic disk media, etc. of respective ECS nodes of ECS cluster 1210) are combined as an integrated system with no access to the storage media other than through the ECS storage system 1200.

In this regard, ECS cluster 1210 comprises multiple nodes 1208*a* . . . 1208N, storage nodes, ECS nodes, etc. Each node is associated with storage devices 1206*a* . . . 1206N, e.g., hard drives, physical disk drives, storage media, etc. In embodiment(s), ECS node 1208*a*, or any ECS node, executing on a hardware appliance can be communicatively coupled, connected, cabled to, etc., e.g., 15 to 120 storage devices. Further, each ECS node can execute one or more services for performing data storage operations described herein.

For instance, the ECS storage system 1200 can be an append-only virtual storage platform that protects content from being erased or overwritten for a specified retention period. In particular, the ECS storage system 1200 does not employ traditional data protection schemes like mirroring or parity protection. Instead, the ECS storage system 1200 utilizes erasure coding for data protection, wherein data, a portion of the data, e.g., a data chunk, is broken into fragments, and expanded and encoded with redundant data pieces and then stored across a set of different locations or storage media, e.g., across different storage nodes.

The ECS storage system 1200 can support storage, manipulation, and/or analysis of unstructured data on a massive scale on commodity hardware. As an example, the ECS storage system 1200 can support mobile, cloud, big data, and/or social networking applications. In another example, the ECS storage system 1200 can be deployed as a turnkey storage appliance, or as a software product that can be installed on a set of qualified commodity servers and disks, e.g., within a node, data storage node, etc. of a cluster, data storage cluster, etc. In this regard, the ECS storage system 1200 can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the cloud-based data storage system can comprise an object storage system, e.g., a file system comprising, but not limited to comprising, a Dell EMC® Isilon file storage system. As an example, a storage engine can write all object-related data, e.g., user data, metadata, object location data, etc. to logical containers of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed, closed, etc. In this regard, content of a sealed, closed, etc. chunk is immutable, e.g., read-only, and after the chunk is closed, the storage engine performs erasure-coding on the chunk.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word-without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component," "system," "engine", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to determine probabilistic likelihoods that code paths utilize operating system synchronization mechanism, as described herein.

A classifier can be a function that maps an input attribute vector, x=(x1, x2, x3, x4, . . . , xn), to a confidence that the input belongs to a class, that is, f (x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," "socket", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a data storage cluster, non-volatile memory 1322, disk storage 1324, and/or memory storage 1346, further description of which is below. For instance, nonvolatile memory can be included in read only memory (ROM), programmable ROM (PROM), electrically programmable ROM (EPROM), electrically erasable ROM (EEPROM), or flash memory. Volatile memory 1320 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 13:
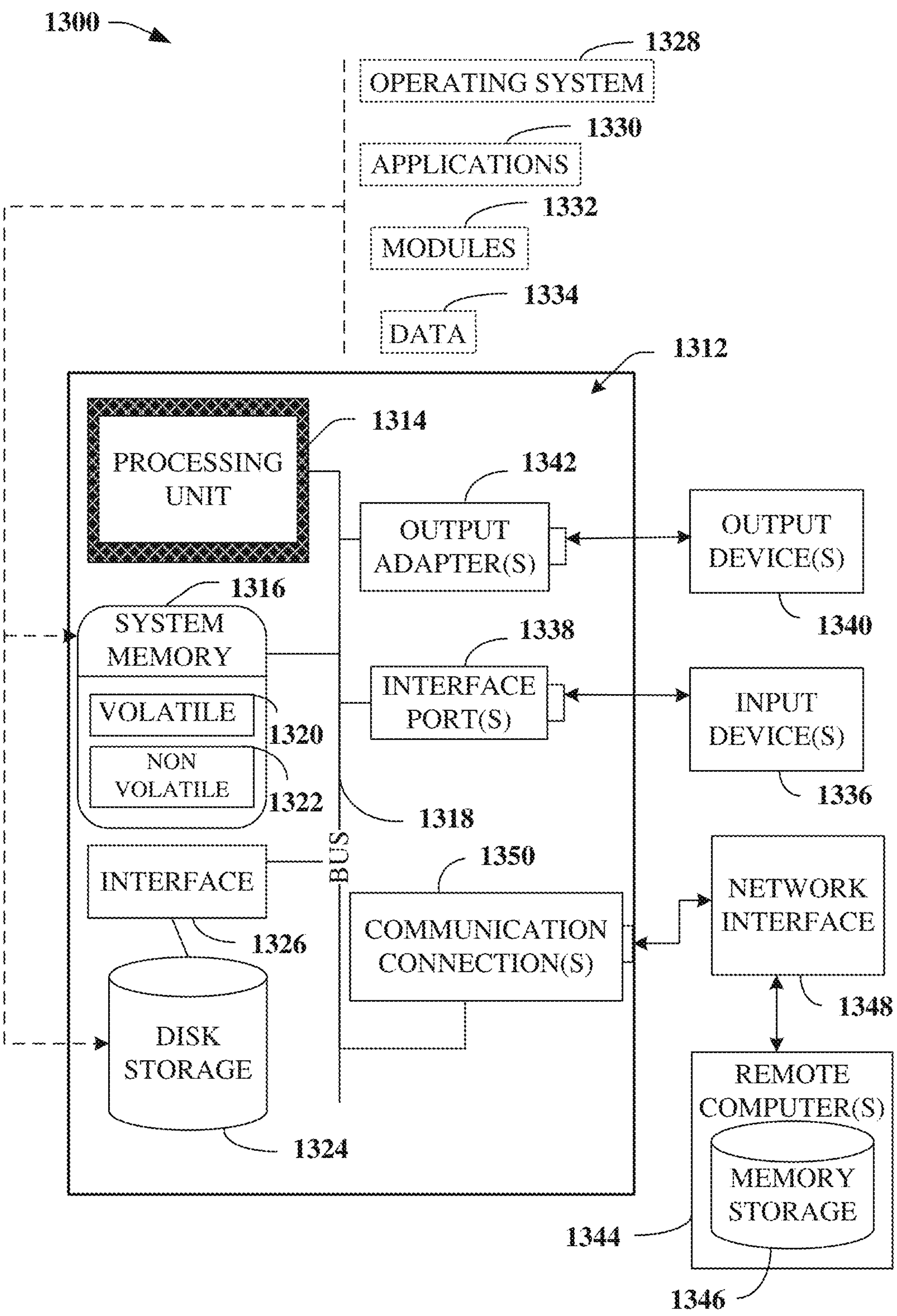
FIG. 13 illustrates a block diagram representing an illustrative non-limiting computing system or operating environment in which one or more aspects of various non-limiting embodiments described herein can be implemented.

In order to provide a context for the various aspects of the disclosed subject matter, FIG. 13, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

FIG. 13, a block diagram of a computing system 1300, e.g., system 700, operable to execute the disclosed example embodiments, is illustrated, in accordance with an embodiment. Computer 1312 comprises a processing unit 1314, a system memory 1316, and a system bus 1318. System bus 1318 couples system components comprising, but not limited to, system memory 1316 to processing unit 1314. Processing unit 1314 can be any of various available processors. Dual microprocessors and other multiprocessor architectures also can be employed as processing unit 1314.

System bus 1318 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCM CIA), Firewire (IEEE 1394), small computer systems interface (SCSI), and/or controller area network (CAN) bus used in vehicles.

System memory 1316 comprises volatile memory 1320 and nonvolatile memory 1322. A basic input/output system (BIOS), containing routines to transfer information between elements within computer 1312, such as during start-up, can be stored in nonvolatile memory 1322. By way of illustration, and not limitation, nonvolatile memory 1322 can comprise ROM, PROM, EPROM, EEPROM, or flash memory.

Volatile memory 1320 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1312 also comprises removable/non-removable, volatile/non-volatile computer storage media. FIG. 13 illustrates, for example, disk storage 1324. Disk storage 1324 comprises, but is not limited to, devices like a magnetic disk drive, floppy disk drive, tape drive, Jaz drive, Zip drive, LS-100 drive, flash memory card, or memory stick. In addition, disk storage 1324 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to system bus 1318, a removable or non-removable interface is typically used, such as interface 1326.

It is to be appreciated that FIG. 13 describes software that acts as an intermediary between users and computer resources described in suitable operating environment 1300. Such software comprises an operating system 1328. Operating system 1328, which can be stored on disk storage 1324, acts to control and allocate resources of computer system 1312. System applications 1330 take advantage of the management of resources by operating system 1328 through program modules 1332 and program data 1334 stored either in system memory 1316 or on disk storage 1324. It is to be appreciated that the disclosed subject matter can be implemented with various operating systems or combinations of operating systems.

A user can enter commands or information into computer 1312 through input device(s) 1336. Input devices 1336 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1314 through system bus 1318 via interface port(s) 1338. Interface port(s) 1338 comprise, for example, a serial port, a parallel port, a game port, a universal serial bus (USB), a wireless based port, e.g., Wi-Fi, Bluetooth, etc. Output device(s) 1340 use some of the same type of ports as input device(s) 1336.

Thus, for example, a USB port can be used to provide input to computer 1312 and to output information from computer 1312 to an output device 1340. Output adapter 1342 is provided to illustrate that there are some output devices 1340, like display devices, light projection devices, monitors, speakers, and printers, among other output devices 1340, which use special adapters. Output adapters 1342 comprise, by way of illustration and not limitation, video and sound devices, cards, etc. that provide means of connection between output device 1340 and system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. Remote computer(s) 1344 can be a personal computer, a server, a router, a network PC, a workstation, a microprocessor based appliance, a peer device, or other common network node and the like, and typically comprises many or all of the elements described relative to computer 1312.

For purposes of brevity, only a memory storage device 1346 is illustrated with remote computer(s) 1344. Remote computer(s) 1344 is logically connected to computer 1312 through a network interface 1348 and then physically and/or wirelessly connected via communication connection 1350. Network interface 1348 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1350 refer(s) to hardware/software employed to connect network interface 1348 to bus 1318. While communication connection 1350 is shown for illustrative clarity inside computer 1312, it can also be external to computer 1312. The hardware/software for connection to network interface 1348 can comprise, for example, internal and external technologies such as modems, comprising regular telephone grade modems, cable modems and DSL modems, wireless modems, ISDN adapters, and Ethernet cards.

The computer 1312 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1312 can connect to other devices/networks by way of antenna, port, network interface adaptor, wireless access point, modem, and/or the like.

The computer 1312 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at a 10 M bps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating there from. Therefore, the disclosed subject matter should not be limited to any single embodiment described herein, but rather should be construed in breadth and scope in accordance with the appended claims below.

What is claimed is:

1. Elastic cloud storage equipment, comprising:
- at least one processor; and
- at least one memory that stores executable instructions that, when executed by the at least one processor, facilitate performance of operations, comprising:
- in response to a garbage collection instance transitioning from a first state to a second state, determining whether small object data has been deleted from a physical storage location associated with an erasure coding strip that is included in a self-garbage collection-chunk;
- clearing a bit of a group of bits from a usage bitmap, wherein the bit of the group of bits represents the physical storage location where the small object data is stored to the erasure coding strip, and wherein the usage bitmap is associated with the erasure coding strip;
- determining, based on the usage bitmap, that all bits of the group of bits representing an erasure coding segment of the erasure coding strip have not been cleared from the usage bitmap;
- performing a garbage collection process within the erasure coding strip; and
- updating a logical memory offset to a physical memory offset mapping based on a result of the performing of the garbage collection process within the erasure coding strip.

2. The elastic cloud storage equipment of claim 1, wherein the garbage collection process is a collapse garbage collection process performed within the erasure coding strip.

3. The elastic cloud storage equipment of claim 2, wherein the collapse garbage collection process comprises:
- determining, using the usage bitmap, locations of a group of voids within the erasure coding strip segment of a collection of erasure coding strip segments associated with the erasure coding strip, wherein the group of voids separates a group of the small object data stored at different locations within the collection of erasure coding strip segments;
- removing the group of voids that separates the group of small object data at the different locations;
- coalescing and redistributing the group of the small object data to reduce a number of erasure coding strip segments of the collection of erasure coding strip segments occupied by the group of small object data; and
- updating the usage bitmap to reflect, in the usage bitmap, the coalescing and the redistributing of the group of small object data.

4. The elastic cloud storage equipment of claim 1, wherein the first state is a hibernation state and the second state is an operational state.

5. The elastic cloud storage equipment of claim 1, wherein a size associated with the small object data is less than a defined size limit threshold.

6. The elastic cloud storage equipment of claim 1, wherein the self-garbage collection-chunk comprises groups of erasure coding strips and groups of mirror strips.

7. The elastic cloud storage equipment of claim 6, wherein an erasure coding strip of the groups of erasure coding strips comprises a defined number of erasure coding segments.

8. The elastic cloud storage equipment of claim 6, wherein a mirror strip of the groups of mirror strips comprise a defined number of mirror segments.

9. The elastic cloud storage equipment of claim 1, wherein the garbage collection process performed within the erasure coding strip included in the self-garbage collection-chunk is a merge-way-garbage collection cross strip process.

10. The elastic cloud storage equipment of claim 1, wherein the erasure coding strip comprises a defined number of parity segments.

11. The elastic cloud storage equipment of claim 1, wherein the erasure coding strip conforms to a code scheme that defines a correspondence pattern of a first number of erasure coding segments to a second number of parity segments.

12. A method, comprising:
- in response to a garbage collection instance transitioning from a first state to a second state, determining, by storage equipment comprising one or more processors, whether small object data has been deleted from a physical storage location associated with an erasure coding strip that is included in a self-garbage collection-chunk;
- clearing, by the storage equipment, a bit of a group of bits from a usage bitmap, wherein the bit of the group of bits represents the physical storage location where the small object data is stored to the erasure coding strip, and wherein the usage bitmap is associated with the erasure coding strip;

based on the usage bitmap, determining, by the storage equipment, that all bits of the group of bits representing an erasure coding segment of the erasure coding strip have not been cleared from the usage bitmap;

executing, by the storage equipment, a first garbage collection process or a second garbage collection process within the erasure coding strip; and maintaining, by the storage equipment, a logical memory offset to a physical memory offset mapping based on a result of the executing of the first garbage collection process or the second garbage collection process within the erasure coding strip.

13. The method of claim 12, wherein the first garbage collection process comprises:

determining, by the storage equipment, via use of the usage bitmap, locations of a group of voids within the erasure coding strip segment of a collection of erasure coding strip segments associated with the erasure coding strip, wherein the group of voids separates a group of the small object data stored at disparate locations within the collection of erasure coding strip segments;

removing, by the storage equipment, the group of voids that separates the group of small object data at the disparate locations;

aggregating and redistributing, by the storage equipment, the group of the small object data to reduce a number of erasure coding strip segments of the collection of erasure coding strip segments occupied by the group of small object data; and modifying, by the storage equipment, the usage bitmap to reflect, in the usage bitmap, the aggregating and the redistributing of the group of small object data.

14. The method of claim 12, wherein the first state is a hibernation state and the second state is an operational state.

15. The method of claim 12, wherein a size associated with the small object data is less than a defined size limit threshold.

16. The method of claim 12, wherein the self-garbage collection-chunk comprises groups of erasure coding strips and groups of mirror strips.

17. The method of claim 12, wherein the second garbage collection process performed within the erasure coding strip included in the self-garbage collection-chunk is a merge-way-garbage collection cross strip process.

18. The method of claim 12, wherein the erasure coding strip conforms to a code scheme that defines a correspondence pattern of a first number of erasure coding segments corresponding to a second number of parity segments.

19. A non-transitory machine-readable medium, comprising executable instructions that, when executed by a network device comprising at least one processor, facilitate performance of operations, comprising:

determining whether small object data has been deleted from a physical storage location associated with an erasure coding strip that is included in a self-garbage collection-chunk;

clearing a bit of a group of bits from a usage bitmap, wherein the bit of the group of bits represents the physical storage location where the small object data is stored to the erasure coding strip, and wherein the usage bitmap is associated with the erasure coding strip;

determining, based on the usage bitmap, that all bits of the group of bits representing an erasure coding segment of the erasure coding strip have not been cleared from the usage bitmap;

executing a collapse garbage collection process within the erasure coding strip; and modifying a logical memory offset to a physical memory offset mapping based on a result of the executing of the collapse garbage collection process within the erasure coding strip.

20. The non-transitory machine-readable medium of claim 19, wherein the collapse garbage collection process comprises:

determining, using the usage bitmap, locations of a group of voids within the erasure coding strip segment of a collection of erasure coding strip segments associated with the erasure coding strip, wherein the group of voids separates a group of the small object data stored at different locations within the collection of erasure coding strip segments;

removing the group of voids that separates the group of small object data at the different locations;

coalescing and redistributing the group of the small object data to reduce a number of erasure coding strip segments of the collection of erasure coding strip segments occupied by the group of small object data; and updating the usage bitmap to reflect, in the usage bitmap, the coalescing and the redistributing of the group of small object data.

* * * * *